United States Patent
Singh et al.

(10) Patent No.: US 11,354,722 B1
(45) Date of Patent: Jun. 7, 2022

(54) METHOD AND MEDIUM FOR PERSONALIZED RECOMMENDATION OF RECIPES INCLUDING BASED ON EMBEDDINGS FOR A USER AND FOR STORED RECIPES

(71) Applicant: Maplebear, Inc., San Francisco, CA (US)

(72) Inventors: Manmeet Singh, Santa Clara, CA (US); Tyler Russell Tate, Vallejo, CA (US); Tejaswi Tenneti, Fremont, CA (US); Sharath Rao Karikurve, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/316,250

(22) Filed: May 10, 2021

(51) Int. Cl.
 *G06Q 30/00* (2012.01)
 *G06Q 30/06* (2012.01)

(52) U.S. Cl.
 CPC ..... *G06Q 30/0631* (2013.01); *G06Q 30/0627* (2013.01); *G06Q 30/0629* (2013.01); *G06Q 30/0633* (2013.01); *G06Q 30/0639* (2013.01)

(58) Field of Classification Search
 CPC ........... G06Q 30/0631; G06Q 30/0627; G06Q 30/0629; G06Q 30/0633; G06Q 30/0639
 See application file for complete search history.

(56) References Cited

U.S. PATENT DOCUMENTS

| | | | |
|---|---|---|---|
| 7,113,917 B2* | 9/2006 | Jacobi | G06Q 30/0282 705/14.67 |
| 7,189,191 B2* | 3/2007 | Dugan | G06Q 30/0631 705/28 |
| 2019/0205973 A1* | 7/2019 | Gutnik | G06Q 30/0641 |

OTHER PUBLICATIONS

Xie, Zhongwei, et al. "Learning TFIDF Enhanced Joint Embedding for Recipe-Image Cross-Modal Retrieval Service." IEEE Transactions on Services Computing. (Year: 2015).*

* cited by examiner

*Primary Examiner* — Matthew E Zimmerman
(74) *Attorney, Agent, or Firm* — Fenwick & West LLP

(57) ABSTRACT

An online concierge shopping system identifies recipes to users to encourage them to include items from the recipes in orders. The online concierge system maintains user embeddings for users and recipe embeddings for recipes. For users who have not placed orders, recipes are recommended based on global user interactions with recipes. Users who have previously ordered items from recipes are suggested recipes selected based on a similarity of their user embedding to recipe embeddings. Users who have purchased items but not from recipes are compared to a set of similar users based on the user embeddings, and recipes with which users of the set of similar users interacted are used for identifying recipes to the users. A recipe graph may be maintained by the online concierge system to identify similarities between recipes for expanding candidate recipes to suggest to users.

20 Claims, 6 Drawing Sheets

METHOD AND MEDIUM FOR PERSONALIZED RECOMMENDATION OF RECIPES INCLUDING BASED ON EMBEDDINGS FOR A USER AND FOR STORED RECIPES

BACKGROUND

This disclosure relates generally to ordering an item through an online concierge system, and more specifically to identifying one or more recipes including one or more items to a user of an online concierge system.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To simplify selection of items for inclusion in an order, an online concierge system may maintain various recipes, with recipe including one or more items. A user of the online concierge system may review a recipe and add items from the recipe to an order through the online concierge system, simplifying selection of items for inclusion in an order. A conventional online concierge system allows a user to browse recipes obtained by the online concierge system. While an online concierge system may organize recipes into different sections to simplify user browsing or selection of recipes, as numbers of recipes in different sections increases, an amount of time for a user to select a particular recipe or to identify a particular recipe of interest increases. This increased time for browsing may discourage a user from subsequent interaction with the online concierge system.

SUMMARY

An online concierge system obtains recipes from one or more sources. Example sources include a warehouse or a third party system (e.g., a website) exchanging information with the online concierge system. Each recipe includes one or more items, or a plurality of items. A recipe may include a quantity corresponding to each item included in the recipe. Additionally, a recipe may include instructions for combining items included in the recipe.

The online concierge system includes the obtained recipes in a recipe graph, which maintains connections between pairs of recipes. A connection between a recipe and another recipe indicates a relationship between the recipe and the other recipe. Connections between recipes are based on information about recipes obtained by the online concierge system. For example, the online concierge system receives a description of a recipe from a user or from a source (e.g., a third party system, a website) that identifies various attributes of the recipe. The online concierge system may also generate one or more attributes of a recipe from items included in the recipe or from other information about an obtained recipe. Example attributes of a recipe include an amount of time to prepare the recipe, a complexity of the recipe, nutritional information about the recipe, a genre of the recipe, or any other suitable information. The online concierge system generates the recipe graph so a recipe has a connection to another recipe having one or more common attributes as the recipe. In some embodiments, a connection between a recipe and another recipe indicates that a user included items from each connected recipe in a common order or included items from each connected recipe in orders the online concierge system received from the user within a threshold amount of time from each other. In various embodiments, each connection between recipes includes a value. For example, the value of a connection between a recipe and another recipe is directly related (e.g., directly proportional to a number of common attributes between the recipe and the other recipe. As another example, the value of a connection between a recipe and another recipe is directly proportional to a number of orders received from users that include items from the recipe and from the other recipe.

For each recipe, the online concierge system generates a recipe embedding. In some embodiments, the recipe embedding for a recipe is based on item embeddings for items included in the recipe. For example, the recipe embedding for a recipe is a weighted average of item embeddings of items included in the recipe. This allows the recipe embedding to be indirectly generated from item embeddings of items included in the recipe.

Alternatively or additionally, the recipe embedding may be generated by applying a recipe model to interactions by users with recipes, such as selection of a recipe for inclusion in an order by users. The recipe model may be a feedforward neural network with multiple layers and weights between nodes in adjacent layers, such as a long short term memory neural network. The recipe model is applied to information stored by the online concierge system describing prior interactions by users of the online concierge system with recipes. Example interactions with recipes by users of the online concierge system include: a user adding one or more items included in a recipe to an order, a user adding at least a threshold number of items in a recipe to an order, viewing a recipe, or any other suitable interaction by a user with a recipe. In some embodiments, generation of a recipe embedding accounts for different words or phrases received by the online concierge system as terms from users in interactions where the user selected one or more items from a recipe for inclusion in an order. Additionally or alternatively, generation of a recipe embedding accounts for categories associated with the recipe by the online concierge system such as a type or a category including a recipe. Other attributes of the recipe that the online concierge system may use when generating a recipe embedding include a preparation time, a level of complexity to prepare the recipe, nutritional information for the recipe, or any other suitable information. The online concierge system stores each recipe embedding in association with a corresponding recipe for subsequent retrieval.

When the online concierge system receives a request for one or more recipes from a user, the online concierge system accounts for amounts of interaction by the user with recipes displayed by the online concierge system. The online concierge system determines whether the online concierge system has previously received an order including one or more items from the user. In some embodiments, the online concierge system determines whether the online concierge system has previously received at least a threshold number of orders from the user. In response to determining that the online concierge system has not previously received an order from the user (or has not received at least a threshold number of orders from the user), the online concierge system retrieves recipes based on interactions with recipes by various other users of the online concierge system. Because the online concierge system has not previously received an order from the user in this scenario, the online concierge system does not maintain information about the user capable of being leveraged for selecting recipes for the user, so the online concierge system leverages information about interactions by other users (e.g., global users of the online concierge system, users of the online concierge system having locations within a threshold distance of the user) with recipes, so recipes for display to the user are selected from the recipes identified based on interactions with recipes by various other users of the online concierge system. In some embodiments, the online concierge system also leverages the recipe graph to identify additional recipes from the recipes identified based on interactions by users of the online concierge system from connections between recipes in the recipe graph. In some embodiments, the online concierge system retrieves additional recipes from the recipe graph that are within a threshold number of connections to a recipe identified based on interactions by users of the online concierge system, allowing the online concierge system to select from a wider range of recipes that accounts for relationships between recipes maintained by the recipe graph.

If the online concierge system determines that an order, or a threshold number of orders, have been received from the user, the online concierge system determines whether the user previously included one or more items from a recipe viewed by the user via the online concierge system in an order (or in at least a threshold number of orders). This allows the online concierge system to determine whether the user has previously interacted with recipes displayed to the user by the online concierge system to include items from one or more recipes in one or more orders. In response to determining that the user has not previously included one or more items from a recipe viewed by the user via the online concierge system, the online concierge system identifies a set of similar users to the user. For example, the online concierge system obtains a user embedding for the user and obtains user embeddings for other users of the online concierge system. The online concierge system determines similarities between the user embedding for the user and user embeddings for various other users and identifies the set of similar users from the similarities. In various embodiments, the set of similar users includes users of the online concierge system with user embeddings having at least a threshold similarity to the user embedding for the user. Alternatively, the set of similar users includes users of the online concierge system having user embeddings with at least a threshold position in a ranking of user embeddings based on similarities to the user embedding for the user. This allows the online concierge system to leverage information about the similar users to complement the limited interaction with recipes by the user.

In various embodiments, the user embeddings and the recipe embeddings have a common latent space, allowing the online concierge system to determine the measure of similarity between a user embedding and a recipe embedding. Further, the user embeddings, recipe embeddings, and items embedding may each be in the common latent spaces in various embodiments. For example, the recipe model is trained based on labeled data for training recipes, with a label indicating whether a user included one or more items from a training recipe in an order, so the recipe model may determine a probability of a user including one or more items from a recipe in an order based on attributes of the recipes to which the recipe model is applied. A recipe embedding is obtained by the online concierge system from an intermediate layer of the recipe model. From recipe embeddings of recipes with which a user interacted (e.g., included an item from a recipe in an order, viewed a recipe, etc.), the user model generates a recipe embedding for the user. For example, the user embedding is a weighted average of recipe embeddings with which the user interacted. This allows the user embeddings and the recipe embeddings to have an equal number of dimensions. Similarly, the item model may be trained based on labeled data for training items, with a label indicating whether a user included a training in an order, so the recipe model may determine a probability of a user including an item in an order based on attributes of the item to which the model is applied. An item embedding is obtained by the online concierge system from an intermediate layer of the item model. The recipe model generates a recipe embedding from item embeddings of items included in the recipe, for example, as a weighted average of item embeddings of items included in the recipe. The user model generates the user embedding from recipe embeddings with which the user interacted, as further described above. Having user embeddings and recipe embeddings have an equal number of dimensions facilitates comparison of user embeddings and recipe embeddings in various embodiments.

From user embeddings for users of the set of similar users, the online concierge system identifies recipes based on measures of similarity to the user embeddings for users of the set of similar users. The online concierge system retrieves recipe embeddings for recipes in the recipe store and determines measures of similarity between various recipe embeddings and a characteristic embedding of the set of similar users. For example, the online concierge system determines a characteristic embedding of the set of similar users as an average of the user embeddings for users of the set of similar users or using any other suitable method. In various embodiments, the measure of similarity between a recipe embedding and the characteristic embedding of the set of similar users is a dot product or a cosine similarity of the recipe embedding and the characteristic embedding; however, in other embodiments, the measure of similarity may be determined through any suitable method. Recipes having at least a threshold measure of similarity to the characteristic embedding of the set of similar users (or having at least a threshold position in a ranking based on measures of similarity to the characteristic embedding of the set or similar users) are identified. Hence, the online concierge system accounts for similarities between recipe embeddings and a characteristic embedding of users who are similar to the user to identify certain recipes. The online concierge system may also identify additional recipes having one or more connections to an identified recipe via the recipe graph.

Alternatively or additionally, the online concierge system retrieves recipes previously presented to one or more users of the set of similar users from which one or more users of the set of similar users selected an item for inclusion in an order. In some embodiments, the online concierge system retrieves recipes from which at least a threshold amount (e.g., number, percentage) of users of the set of similar users included in item in an order after the recipes were displayed to the users. Further, the online concierge system may identify recipes from which users of the set of similar users previously included items in orders, leveraging interactions by the users of the similar set of users with recipes to identify recipes.

In response to determining that the user has previously included one or more items from a recipe viewed by the user via the online concierge system, the online concierge system obtains a user embedding for the user. When the online concierge system has previously received an order (or a threshold number of orders) from the user including one or more items from recipes displayed to the user by the online concierge system, the prior interactions with recipes by the user are leveraged to identify recipes for the user. As the user embedding and the recipes are in a common latent space, the online concierge system determines measures of similarity between the user embedding for the user and recipe embeddings for various recipes and identifies recipes based on measures of similarity between the user embedding for the user and the recipe embeddings. Recipes having at least a threshold measure of similarity to the user embedding (or having at least a threshold position in a ranking based on measures of similarity to the user embedding) are identified. Hence, the online concierge system accounts for similarities between recipe embeddings and a user embedding of the user to identify certain recipes.

In various embodiments, the online concierge system augments the recipes selected from their measures of similarity to the user embedding using connections between the recipes and additional recipes from the recipe graph. In some embodiments, the online concierge system retrieves additional recipes from the recipe graph that are within a threshold number of connections to a recipe identified based on a measure of similarity to the user embedding, allowing the online concierge system to select from a wider range of recipes that accounts for relationships between recipes maintained by the recipe graph. Similarly, the online concierge system retrieves recipes previously presented to the user from which the user selected an item for inclusion in an order. As further described above, the online concierge system may identify additional recipes connected to a recipe previously presented to the user from which the user included an item after being displayed to the user to identify a wider range of recipes for the user.

Hence, depending on amount of interaction by the user with the online concierge system and with recipes displayed by the online concierge system, the online concierge system retrieves recipes from different sources. Example sources from which recipes are retrieved include: recipes identified from interactions by various users (e.g., global users, users within a threshold distance of a location of the user), recipes previously presented to the user or to users of a set of similar users from which the user or a user of the set of similar users previously included an item after a recipe was displayed, and recipes selected based on a measure of similarity to the user embedding of the user or to a characteristic embedding of the set of similar users. The online concierge system also accounts for relationships between recipes maintained by the recipe graph to identify additional recipes. This allows the online concierge system to account for a broader range of recipes when selecting one or more recipes for display to the user, increasing a likelihood of the user being presented with a recipe from which the user purchases one or more items.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
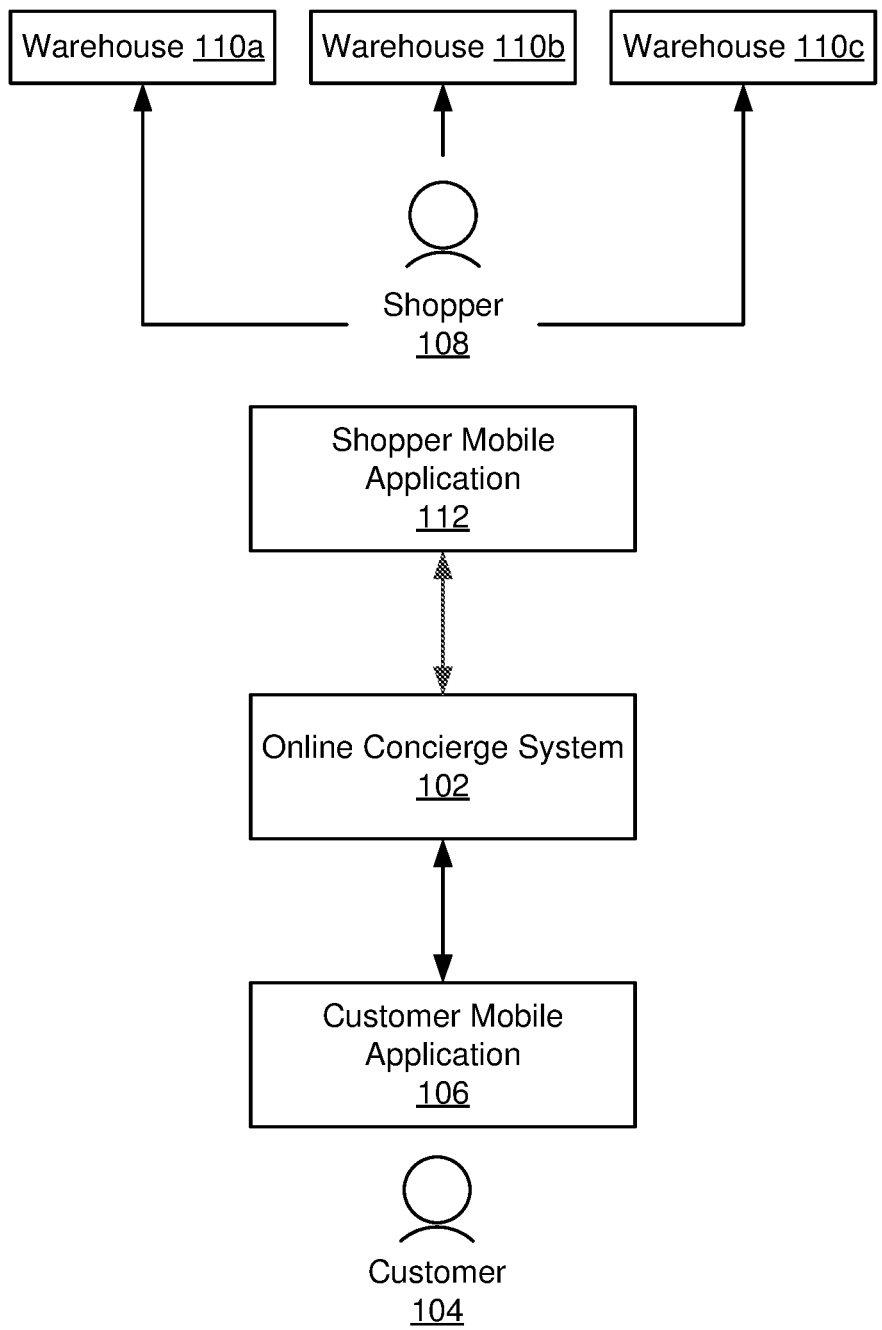
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
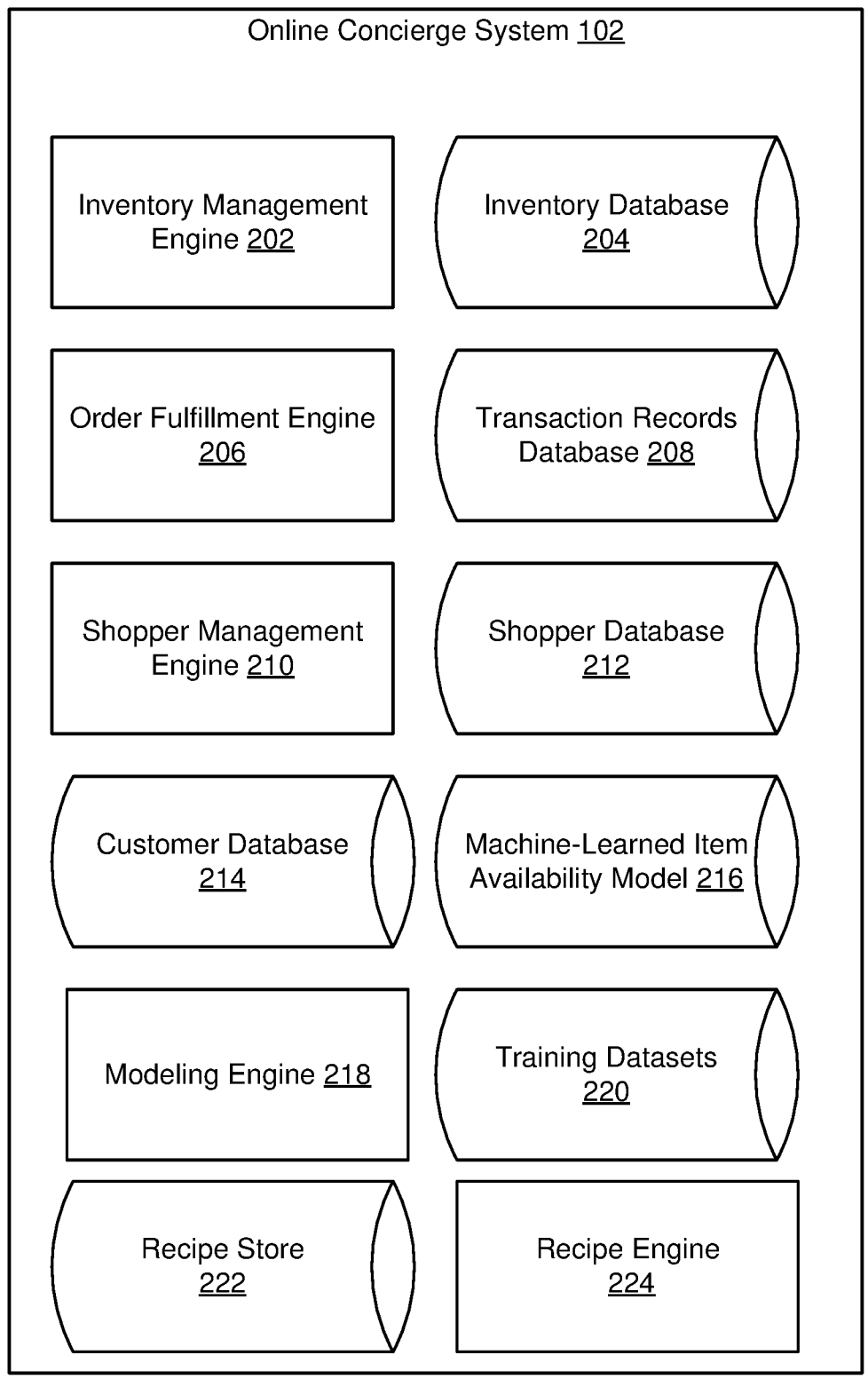
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIGS. 4 and 5.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In various embodiments, the order fulfillment engine 206 generates and maintains an item graph, further described below in conjunction with FIGS. 6 and 7. The item graph identifies connections between pairs of items and attributes of items and between pairs of attributes of items. A connection between an item and an attribute indicates that the item has the attribute to which the item is connected. As further described below in conjunction with FIG. 7, the attributes of an item may be specified by information describing the product from a warehouse 110 providing the item or determined by the order fulfillment engine 206 based on information about the item received from the warehouse 110. A connection between an attribute and an additional attribute indicates that the attribute and the additional attribute have both occurred in one or more previously received orders for items. For example, the attribute is connected to the additional attribute if a previously received order included an item having the attribute and having another item having the additional attribute. Similarly, the attribute is connected to the additional attribute if a previously received order included an item having both the attribute and having the other attribute. As further described below in conjunction with FIG. 6, the order fulfillment engine 206 uses the item graph to generate search results of items in response to a search query received from a customer 104, allowing the order fulfillment engine 206 to leverage information about different attributes and items to increase a likelihood of identifying items that at least partially match the search query for inclusion in an order.

Machine Learning Model

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a customer or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 includes an item model, a user model, and a recipe model. The item model generates an item embedding for an item based on attributes of the item. The user model generates a user embedding for a user based on characteristics of the user and interactions of the user. Similarly, the recipe model generates a recipe embedding for a recipe including one or more items based on attributes of the recipe and interactions with the recipe by users. Each of the item embedding, user embedding, and recipe embedding are high-dimensional vectors (e.g., 256 dimensions) including relative information about an item, a user, and a recipe, respectively, within the latent space of the item embedding, the user embedding, and the recipe embedding. The user model generates the embedding for the user based on prior purchases by the user, preferences of the user, and any other suitable characteristics of the user. The item model generates the embedding for the item based on different words or phrases received by the online concierge system 102 as terms from users in interactions where the user selected the item, one or more categories associated with the item, popularity of the item at a warehouse 110, or any other suitable attributes of an item. The recipe model generates a recipe embedding from item embeddings corresponding to item embeddings of items included in the recipe; for example, the recipe model generates a recipe embedding as an average or a weighted average of item embeddings of items included in the recipe. In other embodiments, the recipe model is applied to information stored by the online concierge system 102 describing prior interactions by users of the online concierge system 102 with recipes. Example interactions with recipes by users of the online concierge system 102 include: a user adding one or more items included in a recipe to an order, a user adding at least a threshold number of items in a recipe to an order, viewing a recipe, or any other suitable interaction by a user with a recipe. In some embodiments, generation of a recipe embedding accounts for different words or phrases received by the online concierge system 102 as terms from users in interactions where the user selected one or more items from a recipe for inclusion in an order. Frequencies with which a word or a phrase were received by the online concierge system 102 in interactions where a user selected the one or more items in the recipe for an order are attributes of a recipe used when generating a recipe embedding. Other attributes of a recipe for generating a recipe embedding include categories associated with the recipe by the online concierge system 102, such as a type or a category including a recipe. Other attributes of a recipe used to generate a recipe embedding in some embodiments include a preparation time, a level of complexity to prepare the recipe, nutritional information for the recipe, or any other suitable information. The recipe model, the user model, and the item model, may each be a feedforward neural network with multiple layers and weights between nodes in adjacent layers, such as a long short term memory neural network; however, the recipe model, the item model, and the user model may be any suitable type or types of machine learned networks in various embodiments. The item embeddings, user embeddings, and recipe embeddings allow the modeling engine 218 to leverage interactions by users with items or recipes that are large and sparse data sets, which are impractical to compare to each other using conventional techniques.

The recipe embeddings and the user embeddings are in a common latent space, so a recipe embedding and a user embedding have an equal number of dimensions in various embodiments, allowing determination of a probability of a user including an item from a recipe in an order based on a measure of similarity (e.g., a dot product, a cosine similarity) between the corresponding user embedding and recipe embedding. In various embodiments, the user embeddings and the recipe embeddings have a common latent space, allowing the online concierge system 102 to determine the measure of similarity between a user embedding and a recipe embedding. Further, the user embeddings, recipe embeddings, and items embedding may each be in the common latent spaces in various embodiments. For example, the modeling engine 218 trains the recipe model from labeled data for training recipes, with a label indicating whether a user included one or more items from a training recipe in an order, so the recipe model may determine a probability of a user including one or more items from a recipe in an order based on attributes of the recipes to which the recipe model is applied. A recipe embedding is obtained by the modeling engine 216 from an intermediate layer of the recipe model. From recipe embeddings of recipes with which a user interacted (e.g., included an item from a recipe in an order, viewed a recipe, etc.), the user model generates a recipe embedding for the user. For example, the user embedding is a weighted average of recipe embeddings with which the user interacted. This allows the user embeddings and the recipe embeddings to have an equal number of dimensions. Similarly, the modeling engine 218 trains the item model from labeled data for training items, with a label indicating whether a user included a training in an order, so the recipe model may determine a probability of a user including an item in an order based on attributes of the item to which the model is applied. An item embedding is obtained by the modeling engine 218 from an intermediate layer of the item model. The recipe model generates a recipe embedding from item embeddings of items included in the recipe, for example, as a weighted average of item embeddings of items included in the recipe. The user model generates the user embedding from recipe embeddings with which the user interacted, as further described above. Having user embeddings and recipe embeddings have an equal number of dimensions facilitates comparison of user embeddings and recipe embeddings in various embodiments.

The recipe store 222 includes information identifying recipes obtained by the online concierge system 102. A recipe includes one or more items, such as a plurality of items, and may also include information describing how to combine the items in the recipe. Recipes may be obtained from users, third party systems (e.g., websites, applications), or any other suitable source and stored in the recipe store 222. Additionally, each recipe has one or more attributes describing the recipe. Example attributes of a recipe include an amount of time to prepare the recipe, a complexity of the recipe, nutritional information about the recipe, a genre of the recipe, or any other suitable information. Attributes of a recipe may be included in the recipe by a source from which the recipe was received or may be determined by the online concierge system 102 from items in the recipe or other information included in the recipe.

Additionally, the recipe store 222 maintains a recipe graph identifying connections between recipes in the recipe store 222. As further describe below in conjunction with FIG. 4, a connection between a recipe and another recipe indicates that the connected recipes each have one or more common attributes. In some embodiments, a connection between a recipe and another recipe indicates that a user included items from each connected recipe in a common order or included items from each connected recipe in orders the online concierge system received from the user within a threshold amount of time from each other. In various embodiments, each connection between recipes includes a value, with the value providing an indication of a strength of a connection between the recipes. The recipe graph is further described below in conjunction with FIG. 4.

The recipe engine 224 selects one or more recipes from the recipe store 222 for display to a user in response to receiving a request for one or more recipes from the user. As further described below in conjunction with FIGS. 5 and 6, the recipe engine 224 accounts for amounts of interaction by the user with recipes displayed by the online concierge system 102. From the transaction records database 208, the recipe engine 224 identifies orders the online concierge system 102 previously received and fulfilled for the user. For users who have not placed orders, the recipe engine 224 selects recipes from the recipe store 222 for display to the user based on global user interactions with recipes. For users who have previously ordered items from recipes displayed to the user, the recipe engine 224 selects recipes for display to the user based on measures of similarities of their user embeddings to recipe embeddings. However, for users who have purchased items but not from recipes displayed to the user, the recipe engine 224 selects a set of similar users based on the user embeddings or other users and the user embedding for the user. The recipe engine 224 selects recipes from the recipe store 222 with which users of the set of similar users interacted are used for identifying recipes to the users. The recipe engine 224 may leverage the recipe graph in the recipe store 222 to identify additional recipes for display to the user. Selection of recipes to display to a user by the recipe engine is further described below in conjunction with FIGS. 5 and 6.

The recipe engine 224 maintains a trained purchase model for selecting recipes for display to a user in some embodiments. The trained purchase model is applied to a user embedding of a user and to recipe embeddings for recipes identified from the recipe store 222 and outputs a probability of the user purchasing one or more items from a recipe after being presented with the recipe. The trained purchase model may be trained based on prior inclusion of items from recipes displayed to the user in orders received from the user from data in the training datasets 220. The trained purchase model may be any suitable machine learning model trained (e.g., using supervised learning, semi-supervised learning, etc.) from labeled data identifying embeddings of recipes previously displayed to the user, with the labels indicating whether the user included one or more items from the recipe in an order after being displayed with the recipe. In various embodiments, the recipe engine 224 selects recipes for display to a user having at least a threshold probability of the user including one or more items from the recipes after the recipes are displayed to the user or selects recipes for display to the user having at least a threshold position in a ranking based on probability of the user including one or more items from the recipes after the recipes are displayed to the user.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
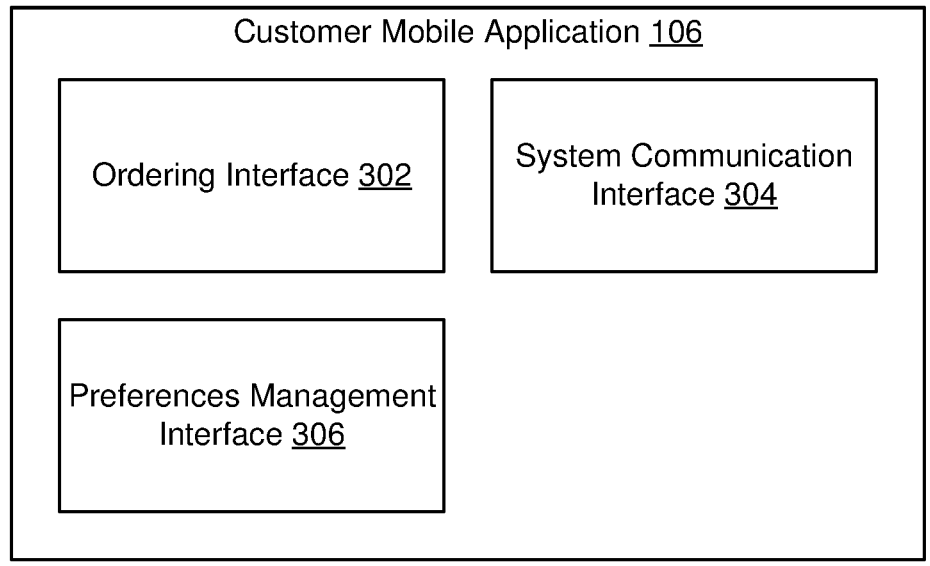
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
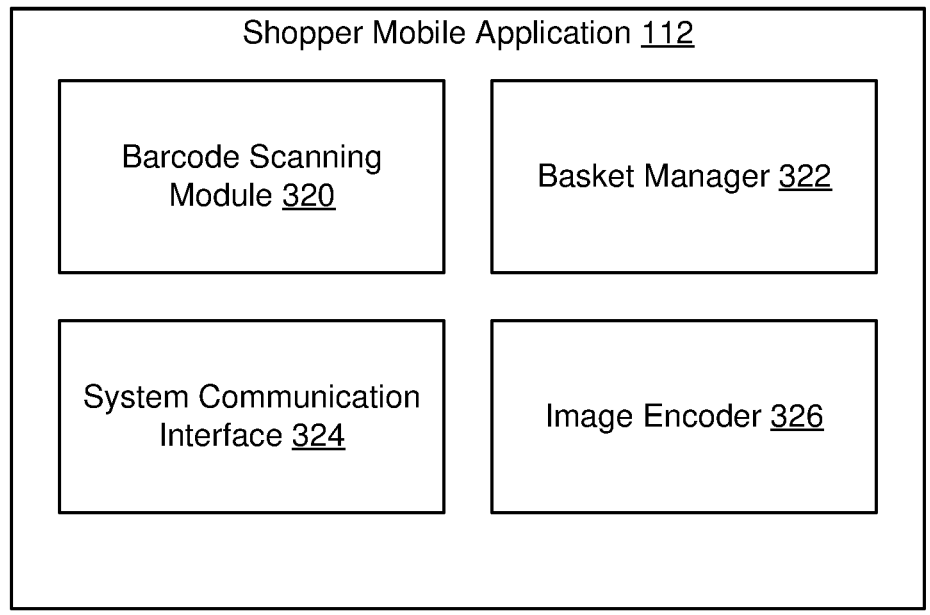
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Recipe Graph

Figure 4:
FIG. 4 is an example of a recipe graph maintained by an online concierge system, according to one embodiment.

FIG. 4 shows an example recipe graph 400 maintained by the online concierge system 102. As further described above in conjunction with FIG. 2, the recipe graph 400 includes recipes maintained or obtained by the online concierge system 102, along with connections between recipes. In the example of FIG. 4, the item graph 400 includes nodes for recipe 410A, recipe 410B, recipe 410C, recipe 410D, and recipe 410E (also referred to individually and collectively using reference number 410). A connection between a recipe 410 and another recipe 410 indicates a relationship between the connected recipes 410 based on information about the recipe 410 obtained by the online concierge system 102 or prior interactions by users of the online concierge system 102 with the recipes 410. Referring to FIG. 4, recipe 410A is connected to recipe 410B and to 410C. Recipe 410B is connected to recipe 410C, and recipe 410C is connected to recipe 410D. The online concierge system 102 may account for a number of connections between recipes 410 in the recipe graph 400 when identifying recipes, with recipes 410 separated by fewer connections having a stronger relationship to each other. In the example of FIG. 4, one connection separates recipe 410A from recipe 410B and recipe 410C. Two connections separate 410A from recipe 410D, and three connections separate recipe 410A and recipe 410E.

Connections between recipes 410 are based on information about recipes 410 obtained by the online concierge system 102. For example, the online concierge system 102 receives a description of a recipe 410 from a user or from a source (e.g., a third party system, a website) that identifies various attributes of the recipe 410. The online concierge system 102 may also generate one or more attributes of a recipe 410 from items included in the recipe 410 or from other information about an obtained recipe 410. Example attributes of a recipe 410 include an amount of time to prepare the recipe 410, a complexity of the recipe 410, nutritional information about the recipe 410, a genre of the recipe 410, or any other suitable information. The online concierge system 102 generates the recipe graph 400 so a recipe 410 has a connection to another recipe 410 having one or more common attributes as the recipe 410. In some embodiments, a connection between a recipe 410 and another recipe 410 indicates that a user included items from each connected recipe 410 in a common order or included items from each connected recipe 410 in orders the online concierge system 102 received from the user within a threshold amount of time from each other. In various embodiments, each connection between recipes 410 includes a value. For example, the value of a connection between a recipe 410 and another recipe 410 is directly related (e.g., directly proportional to a number of common attributes between the recipe 410 and the other recipe 410. As another example, the value of a connection between a recipe 410 and another recipe 410 is directly proportional to a number of orders received from users that include items from the recipe 410 and from the other recipe 410.

Selecting One or More Recipes for Display a User

Figure 5:
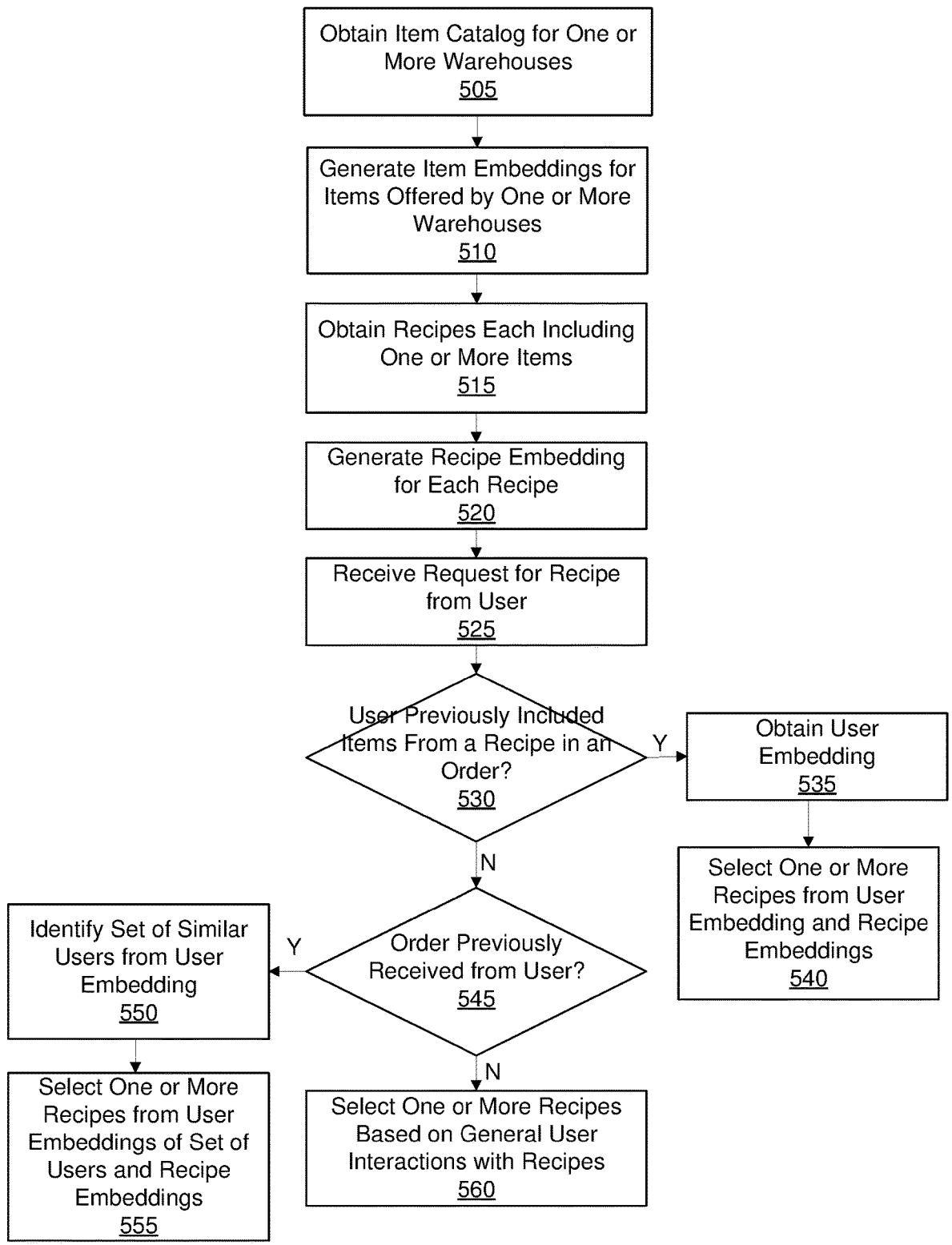
FIG. 5 is a flowchart of a method for an online concierge system selecting one or more recipes for a user, according to one embodiment.

FIG. 5 is a flowchart of one embodiment of a method for selecting one or more recipes for a user of an online concierge system 102. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

The online concierge system 102 obtains 505 an inventory of items offered by one or more warehouses 110. In some embodiments, the online concierge system 102 obtains 505 an inventory from each warehouse 110, with an inventory from a warehouse identifying items offered by the warehouse 110. The inventory includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system 102 for the item and included in the entry for the item in the inventory. Example attributes specified by the online concierge system 102 for an item include: a category for the item, one or more sub-categories for the item, and any other suitable information for the item.

From the information about various items in the inventory and information stored by the online concierge system 102 describing prior interactions by users of the online concierge system 102 selecting items, the online concierge system 102 generates 510 an embedding for each item. In various embodiments, the online concierge system 102 generates 510 the item embedding by applying an item model to attributes of the item. In some embodiments, the item embedding is generated from different words or phrases received by the online concierge system 102 as terms from users in interactions where the user selected the item. Frequencies with which words or phrases were received by the online concierge system 102 in interactions where a user selected the item are used when generating 510 the item embedding. The online concierge system 102 maintains a stored vocabulary of words corresponding to dimensions of an embedding in various embodiments. Additionally, generation of an embedding for an item accounts for categories associated with the item by the online concierge system 102, such as a department within a warehouse 110 including an item. Interactions in which items were selected by users that occurred within a specified time interval (e.g., within 180 days of a current date) may be accounted for by the online concierge system 102 when generating 510 the item embedding. The online concierge system 102 may generate 510 embeddings for items at a periodic interval, such as daily. In some embodiments, embeddings for items are generated 510 at different intervals for different warehouses 110. In some embodiments, the online concierge system 102 obtains 505 an inventory from each warehouse 110, with an inventory from a warehouse identifying items offered by the warehouse 110. The inventory includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system 102 for the item and included in the entry for the item in the inventory. Example attributes specified by the online concierge system 102 for an item include: a category for the item, one or more sub-categories for the item, and any other suitable information for the item.

From the information about various items in the inventory and information stored by the online concierge system 102 describing prior interactions by users of the online concierge system 102 selecting items, the online concierge system 102 generates 510 an embedding for each item. The online concierge system 102 generates 510 the item embedding by applying an item model to attributes of the item in some embodiments. The item model generate the embedding for the item based on different words or phrases received by the online concierge system 102 as terms from users in interactions where the user selected the item, one or more categories associated with the item, popularity of the item at a warehouse 110, or any other suitable attributes of an item. In various embodiments, the item model is iteratively trained from labeled data using any suitable method (e.g., supervised learning, semi-supervised learning, etc.), with the trained item model stored and subsequently applied to one or more items within an item catalog.

In some embodiments, the item embedding is generated 510 from different words or phrases received by the online concierge system 102 as terms from users in interactions where the user selected the item. Frequencies with which various words or phrases were received by the online concierge system 102 in interactions where a user selected the item are attributes of the item from which the item embedding is generated 510. The online concierge system 102 maintains a stored vocabulary of words corresponding to dimensions of an embedding in various embodiments. Categories associated with the item by the online concierge system 102, such as a department within a warehouse 110 including an item, are also attributes of the item from which the item embedding is generated 510. When determining values of dimensions of embeddings for an item, the online concierge system 102 may evaluate interactions in which items were selected by users that occurred within a specified time interval (e.g., within 180 days of a current date). Alternatively or additionally, the online concierge system 102 orders items by dates when a user purchased or selected the items and generates 510 embeddings for items having at least a threshold position in the ordering, allowing generation of the embeddings for more recently purchased or selected items. The online concierge system 102 may generate 510 embeddings for items at a periodic interval, such as daily. In some embodiments, embeddings for items are generated 510 at different intervals for different warehouses 110.

Additionally, the online concierge system 102 obtains 515 recipes from one or more sources. Example sources include a warehouse 110 or a third party system (e.g., a website) exchanging information with the online concierge system 102. Each recipe includes one or more items, or a plurality of items. A recipe may include a quantity corresponding to each item included in the recipe. Additionally, a recipe may include instructions for combining items included in the recipe. The online concierge system 102 includes the obtained 515 recipes in a recipe graph, further described above in conjunction with FIG. 5, allowing the online concierge system 102 to maintain relationships between recipes.

For each recipe, the online concierge system 102 generates 520 a recipe embedding. In some embodiments, the recipe embedding for a recipe is based on item embeddings for items included in the recipe. For example, the recipe embedding for a recipe is a weighted average of item embeddings of items included in the recipe. This allows the recipe embedding to be indirectly generated from item embeddings of items included in the recipe.

Alternatively or additionally, the recipe embedding may be generated 520 by applying a recipe model to interactions by users with recipes, such as selection of a recipe for inclusion in an order by users. The recipe model may be a feedforward neural network with multiple layers and weights between nodes in adjacent layers, such as a long short term memory neural network. The recipe model is applied to information stored by the online concierge system 102 describing prior interactions by users of the online concierge system 102 with recipes. Example interactions with recipes by users of the online concierge system include: a user adding one or more items included in a recipe to an order, a user adding at least a threshold number of items in a recipe to an order, viewing a recipe, or any other suitable interaction by a user with a recipe. In some embodiments, a recipe embedding is generated 520 from different words or phrases received by the online concierge system 102 as terms from users in interactions where the user selected one or more items from a recipe for inclusion in an order. Frequencies with which various words or phrases were received by the online concierge system 102 in interactions where a user selected the one or more items in the recipe for an order are attributes of a recipe used for generating 520 a recipe embedding in various embodiments. The online concierge system 102 maintains a stored vocabulary of words corresponding to dimensions of a recipe embedding in various embodiments. Categories associated with the recipe by the online concierge system 102, such as a type or a category including a recipe, a preparation time, a level of complexity to prepare the recipe, nutritional information for the recipe, or any other suitable information are other attributes of a recipe the online concierge system 102 uses to generate 520 a recipe embedding in various embodiments. When determining values of dimensions of recipe embeddings for an item, the online concierge system 102 may evaluate interactions in which items from a recipe were selected by users that occurred within a specified time interval (e.g., within 180 days of a current date). The online concierge system 102 may generate 520 recipe embeddings for various recipes at a periodic interval, such as daily. The recipe model may account for both item embeddings of items within a recipe and prior user interactions with the recipe when generating 520 recipe embeddings in various embodiments. The online concierge system 102 stores each recipe embedding in association with a corresponding recipe for subsequent retrieval.

When the online concierge system 102 receives 525 a request for a recipe from a user, the online concierge system 102 retrieves prior interactions by the user with the online concierge system 102 and determines 530 whether the user previously included one or more items from a recipe viewed by the user via the online concierge system 102 in an order (or in at least a threshold number of orders). For example, the online concierge system 102 receives 525 a request from the user to display one or more recipes to the user and retrieves stored interactions by the user stored by the online concierge system 102. From the stored interactions, the online concierge system 102 determines 530 whether the user previously viewed a recipe via the online concierge system 102 and included one or more items from the viewed recipe in an order (or whether the user previously viewed one or more recipes and included items from one or more recipes in at least a threshold number of orders).

In response to determining 530 that the user from whom the request was received 525 previously included one or more items included in one or more recipes displayed to the user in one or more orders via the online concierge system 102, the online concierge system 102 obtains 535 a user embedding for the user. In various embodiments, the online concierge system 102 applies a user model maintained by the online concierge system 102 to characteristics of the user to generate the user embedding. Example characteristics of a user identified by a user embedding include items purchased by the user, categories associated with items purchased by a user, preferences of the user, restrictions of the user, warehouses 110 from which the user purchased items, recipes displayed to the user, recipes from which the user included an item in one or more orders, and any other suitable characteristics. In some embodiments, the user embedding comprises a feature vector having multiple dimensions, with each dimension including a value describing one or more characteristics of the user. In various embodiments, the user model is a feedforward neural network, or other suitable neural network, trained from labeled characteristics of users through any suitable training method (e.g., supervised learning, semi-supervised learning, etc.), stored by the online concierge system 102 and applied to characteristics of the user. The user embedding is stored by the online concierge system 102 in association with the user.

From the user embedding and one or more recipe embeddings, the online concierge system 102 selects 540 one or more recipes for display the user. For example, the online concierge system 102 determines a measure of similarity between the user embedding and each of at least a set of recipe embeddings. In various embodiments, the measure of similarity between the user embedding and a recipe embedding is a dot product of the user embedding and the recipe embedding, while in other embodiments the measure of similarity between the user embedding and a recipe embedding is determined using any suitable technique (e.g., cosine similarity, Euclidian distance, etc.). From the measures of similarity between the user embedding and each of the set of recipe embeddings, the online concierge system 102 selects a set of candidate recipes. For example, the set of candidate recipes includes recipes having recipe embeddings with at least a threshold measure of similarity to the user embedding. As another example, the online concierge system 102 ranks the recipe embeddings by their measures of similarity to the user embedding so recipe embeddings with a higher measure of similarity have higher positions in the ranking, and selects the set of candidate recipes as recipes with recipe embeddings having at least a threshold position in the ranking.

When selecting 540 the one or more recipes for display the user, the online concierge system 102 also accounts for recipes from which the user previously included one or more items in an order and connections between recipes via the recipe graph. For example, the online concierge system 102 includes in the set of candidate recipes one or more recipes from which the user previously included at least one or more items in orders. In some embodiments, the online concierge system 102 identifies connections between additional recipes and recipes from which the user previously included one or more items in one or more orders. For example, the online concierge system 102 identifies additional recipes directly connected to at least one recipe from which the user previously included at least one or more items in orders as candidate recipes. In another example, the online concierge system 102 identifies additional recipes within a threshold number of connections of at least one recipe from which the user previously included at least one or more items in orders as candidate recipes. Additionally, the online concierge system 102 may identify one or more recipes having at least a threshold amount of interaction by global users of the online concierge system 102, or by users of the online concierge system 102 within a threshold distance of a location associated with the user, as candidate recipes. In some embodiments, the online concierge system 102 determines or retrieves measures of similarities between each recipe embedding corresponding to a candidate recipe and the user embedding and selects 540 one or more candidate recipes based on the measures of similarity for display to the user. For example, the online concierge system 102 ranks the candidate recipes based on their measures of similarity and selects 540 one or more candidate recipes corresponding to recipe embeddings having at least a threshold position in the ranking. The online concierge system 102 may select 540 candidate recipes so the selected candidate recipes include candidate recipe from at least a threshold number of sources, where the sources are: candidate recipes identified by measure of similarity to the user embedding, recipes from which the user included an item in one or more previous orders, additional recipes connected to a recipe from which the user included an item in one or more previous orders, and recipes having at least a threshold amount of interaction by users of the online concierge system 102.

In response to determining 530 that the user from whom the request was received 525 has not previously included one or more items included in one or more recipes displayed to the user in one or more orders via the online concierge system 102, the online concierge system 102 determines 545 whether the online concierge system 102 previously received an order from the user. In some embodiments, the online concierge system 120 determines 545 whether the online concierge system 102 previously received at least a threshold number of orders from the user when the user has not previously included one or more items included in one or more recipes displayed to the user in one or more orders via the online concierge system 102.

In response to determining 545 that the online concierge system 102 previously received an order from the user, but that the user has not included an item included in a recipe previously presented to the user via the online concierge system 102 in an order, the online concierge system 102 identifies 550 a set of similar users to the user based on user embeddings for other users (e.g., users in a set of users) and the user embedding for the user. To identify 550 the set of similar users, the online concierge system 102 determines similarities between the user embedding for the user and user embeddings for other users (e.g., users in a set of users). In various embodiments, the similarity between the user embedding for the user and user embedding for another user is a dot product of the user embeddings, while in other embodiments the measure of similarity between the user embedding for the user and the user embedding for another user is determined using any suitable technique (e.g., cosine similarity, Euclidian distance, etc.). From the determined seminaries, the online concierge system 102 identifies 550 the set of similar users. In one embodiment, the set of similar users includes users having user embeddings with at least a threshold similarity to the user embedding for the user. As another example, the online concierge system 102 ranks other users based on the similarities of user embeddings for the other users to the user embedding for the user and identifies 550 the set of similar users as other users having user embeddings with at least a threshold position in the ranking.

The online concierge system 102 leverages the user embeddings for users of the set of similar users to select 550 one or more recipes for display to the user. For example, the online concierge system 102 determines a measure of similarity between user embeddings for users of the set of similar users and each of at least a set of recipe embeddings, as further described above. In some embodiments, the online concierge system 102 generates a characteristic embedding for the set of similar users based on user embeddings for users of the set of similar users and determines the measure of similarity between the characteristic embedding and each of at least the set of recipe embeddings. For example, a characteristic embedding is generated by averaging values of dimensions of user embeddings for users of the set of similar users. The online concierge system 102 may weight one or more dimensions of user embeddings based on any suitable criteria and generate the characteristic embedding based on the weighted values of dimensions of user embeddings in the collection.

When selecting 555 the one or more recipes for display to the user, the online concierge system 102 also accounts for recipes from which users of the set of similar users previously included one or more items in an order and connections between recipes via the recipe graph. For example, the online concierge system 102 includes in the set of candidate recipes one or more recipes from which at least a threshold number of users of the set included one or more items in orders. In some embodiments, the online concierge system 102 identifies connections between additional recipes and recipes from which the threshold number of users of the set previously included one or more items in orders via the recipe graph. For example, the online concierge system 102 identifies additional recipes directly connected to at least one recipe from which the threshold number of users of the set previously included at least one or more items in orders as candidate recipes. In another example, the online concierge system 102 identifies additional recipes within a threshold number of connections of at least one recipe from which the threshold number of users previously included at least one or more items in orders as candidate recipes. Additionally, the online concierge system 102 may identify one or more recipes having at least a threshold amount of interaction by global users of the online concierge system 102, or by users of the online concierge system 102 within a threshold distance of a location associated with the user, as candidate recipes. In some embodiments, the online concierge system 102 determines or retrieves measures of similarities between each recipe embedding corresponding to a candidate recipe and the user embeddings of users of the set, or the characteristic embedding of the set of similar users, and selects 555 one or more candidate recipes based on the measures of similarity for display to the user. For example, the online concierge system 102 ranks the candidate recipes based on their measures of similarity and selects 555 one or more candidate recipes corresponding to recipe embeddings having at least a threshold position in the ranking. The online concierge system 102 may select 555 candidate recipes so the selected candidate recipes include candidate recipe from at least a threshold number of sources, where the sources are: candidate recipes identified by measure of similarity to the user embedding, recipes from which the threshold number of users of the set of similar users included an item in one or more previous orders, additional recipes connected to a recipe from which the threshold number of users of the set of similar users included an item in one or more previous orders, and recipes having at least a threshold amount of interaction by users of the online concierge system 102.

In response to determining 530 that the user from whom the request was received 525 has not previously included one or more items included in one or more recipes displayed to the user in one or more orders via the online concierge system 102, the online concierge system 102 and to determining 545 the online concierge system 102 has not previously received an order from the user, the online concierge system 102 selects 560 one or more recipes for display to the user based on general interactions by users of the online concierge system 102 with recipes. For example, the online concierge system 102 selects 560 one or more recipes having at least a threshold amount of interaction by global users of the online concierge system 102 or selects 560 one or more recipes having at least a threshold amount of interaction by users of the online concierge system 102 within a threshold distance of a location associated with the user. The online concierge system 102 may also account for connections between recipes via the recipe graph when selecting 560 one or more recipes for display to the user. For example, the online concierge system 102 identifies additional recipes directly connected to at least one recipe having at least the threshold amount of interaction by users of the online concierge system 102 and selects 560 one or more of the additional recipes for display to the user. In another example, the online concierge system 102 identifies additional recipes within a threshold number of connections of at least one recipe having at least the threshold amount of interaction by users of the online concierge system 102 and selects 560 one or more of the additional recipes for display to the user. The online concierge system 102 accounts for information included in a user profile of the user when selecting 560 recipes for display to the user; for example, the online concierge system 102 limits selection 560 of recipes to recipes with attributes satisfying one or more preferences included in the user profile of the user, increasing a relevance of the selected recipes to the user.

The online concierge system 102 transmits information describing the one or more selected recipes to a client device for display to the user. For example, the customer mobile application 106 includes one or more interfaces displaying information describing recipes, and information describing the selected recipes received by a client device is displayed in an interface of the customer mobile application 106. In other embodiments, the information describing the one or more selected recipes is displayed in any suitable manner by a client device receiving the information from the online concierge system 102.

Figure 6:
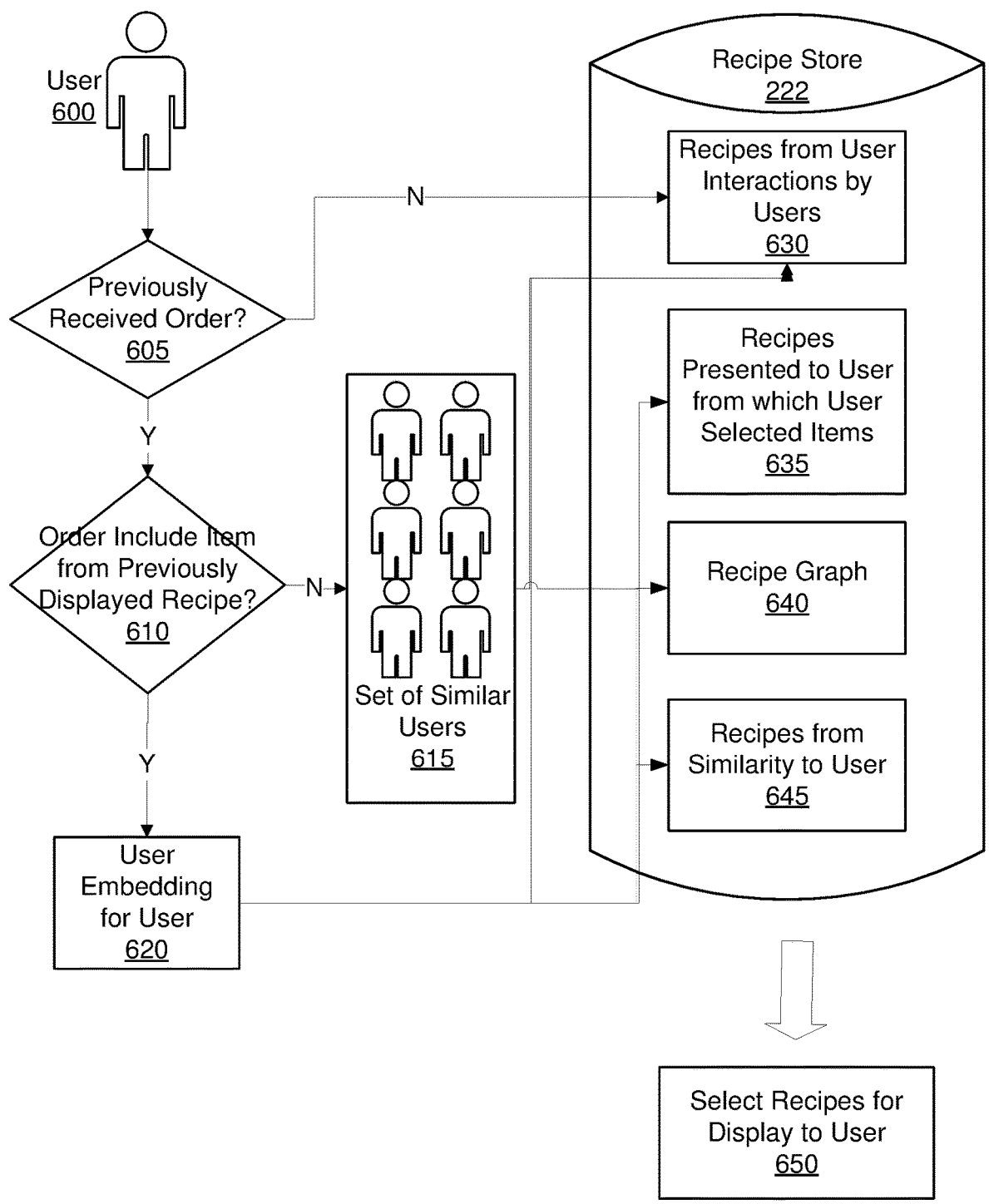
FIG. 6 is a process flow diagram of a method for an online concierge system selecting one or more recipes for a user, according to one embodiment.

FIG. 6 is a process flow diagram of one embodiment of a method for selecting one or more recipes of a user of an online concierge system 102. In the example of FIG. 6, the online concierge system 102 receives a request for one or more recipes from a user 600. To provide the user with recipes likely to be relevant to the user (i.e., recipes from which the user is likely to include one or more items in an order via the online concierge system 102), the online concierge system 102 accounts for prior interactions by the user 600 with the online concierge system 102 and different sources of recipes included in a recipe store 222 maintained by the online concierge system 102. As further described above in conjunction with FIG. 5, the online concierge system 102 reviews recipes from different sources in the recipe store 222 in response to differing amounts of interaction by the user 600 with the online concierge system 102.

For example, the online concierge system 102 determines 605 whether the online concierge system 102 has previously received an order including one or more items from the user 600. In some embodiments, the online concierge system 102 determines 605 whether the online concierge system 102 has previously received at least a threshold number of orders from the user 600. In response to determining 605 that the online concierge system 102 has not previously received an order from the user 600 (or has not received at least a threshold number of orders from the user 600), the online concierge system 102 retrieves recipes 635 based on interactions with recipes by various other users of the online concierge system 102. Because the online concierge system 102 has not previously received an order from the user 600 in this scenario, the online concierge system 102 does not maintain information about the user 600 capable of being leveraged for selecting recipes for the user, so the online concierge system 102 leverages information about interactions by other users (e.g., global users of the online concierge system 102, users of the online concierge system 102 having locations within a threshold distance of the user 600) with recipes, so recipes for display to the user are selected from the recipes 635 identified based on interactions with recipes by various other users of the online concierge system 102.

In some embodiments, the online concierge system 102 also leverages a recipe graph 640 maintained in the recipe store 222 to identify additional recipes from the recipes 635 identified based on interactions by users of the online concierge system 102. As further described above in conjunction with FIGS. 2 and 4, the recipe graph 640 maintains connections between recipes based on attributes of the recipes and user interactions with the recipes, with a connection between a pair of recipes indicating a recipe in the pair has a relationship with the other recipe in the pair. In some embodiments, the online concierge system 102 retrieves additional recipes from the recipe graph 640 that are within a threshold number of connections to a recipe 635 identified based on interactions by users of the online concierge system 102, allowing the online concierge system 102 to select from a wider range of recipes that accounts for relationships between recipes maintained by the recipe graph 640.

If the online concierge system 102 determines 605 that an order, or a threshold number of orders, have been received from the user 600, the online concierge system 102 determines 610 whether the user 600 previously included one or more items from a recipe viewed by the user 600 via the online concierge system 102 in an order (or in at least a threshold number of orders). This allows the online concierge system 102 to determine whether the user 600 has previously interacted with recipes displayed to the user by the online concierge system 102 to include items from one or more recipes in one or more orders. In response to determining 610 that the user has not previously included one or more items from a recipe viewed by the user 600 via the online concierge system 102, the online concierge system 102 identifies a set 615 of similar users to the user 600. As further described above in conjunction with FIG. 5, the online concierge system 102 obtains a user embedding for the user 600 and obtains user embeddings for other users of the online concierge system 102. The online concierge system 102 determines similarities between the user embedding for the user and user embeddings for various other users and identifies the set 615 of similar users from the similarities. In various embodiments, the set 615 of similar users includes users of the online concierge system 102 with user embeddings having at least a threshold similarity to the user embedding for the user 600. Alternatively, the set 615 of similar users includes users of the online concierge system 102 having user embeddings with at least a threshold position in a ranking of user embeddings based on similarities to the user embedding for the user 600. This allows the online concierge system 102 to leverage information about the similar users 102 to complement the limited interaction with recipes by the user 600.

From user embeddings for users of the set 615 of similar users, the online concierge system 102 identifies recipes 645 based on measures of similarity to the user embeddings for users of the set 615 of similar users. As further described above in conjunction with FIG. 5, the online concierge system 102 retrieves recipe embeddings for recipes in the recipe store 222 and determines measures of similarity between various recipe embeddings and a characteristic embedding of the set 615 of similar users. For example, the characteristic embedding 615 of the set 615 of similar users is an average of the user embeddings for users of the set 615 of similar users. In various embodiments, the measure of similarity between a recipe embedding and the characteristic embedding of the set 615 of similar users is a dot product or a cosine similarity of the recipe embedding and the characteristic embedding; however, in other embodiments, the measure of similarity may be determined through any suitable method. Recipes 645 having at least a threshold measure of similarity to the characteristic embedding of the set 615 of similar users (or having at least a threshold position in a ranking based on measures of similarity to the characteristic embedding of the set 615 or similar users) are identified. Hence, the online concierge system 102 accounts for similarities between recipe embeddings and a characteristic embedding of users who are similar to the user 600 to identify certain recipes 645.

In various embodiments, the online concierge system 102 augments the recipes 645 selected from their measures of similarity to the characteristic embedding of the set 615 of similar users using connections between the recipes 645 and additional recipes from the recipe graph 640. In some embodiments, the online concierge system 102 retrieves additional recipes from the recipe graph 640 that are within a threshold number of connections to a recipe 645 identified based on a measure of similarity to the characteristic embedding of the set 615 of similar users, allowing the online concierge system 102 to select from a wider range of recipes that accounts for relationships between recipes maintained by the recipe graph 640. Similarly, the online concierge system 102 retrieves recipes 635 previously presented to one or more users of the set 615 of similar users from which one or more users of the set 615 of similar users selected an item for inclusion in an order. In some embodiments, the online concierge system 102 retrieves recipes 615 from which at least a threshold amount (e.g., number, percentage) of users of the set 615 of similar users included in item in an order after the recipes 615 were displayed to the users. As further described above, the online concierge system 102 may identify additional recipes connected to a recipe 635 previously presented to one or more users of the set 615 of similar users via the recipe graph 640 to identify a wider range of recipes for the user 600.

In response to determining 610 that the user has previously included one or more items from a recipe viewed by the user 600 via the online concierge system 102, the online concierge system 102 obtains a user embedding 620 for the user 600, as further described above in conjunction with FIG. 5. When the online concierge system 102 has previously received an order (or a threshold number of orders) from the user 600 including one or more items from recipes displayed to the user 600 by the online concierge system 102, the prior interactions with recipes by the user 600 are leveraged to identify recipes for the user. As further described above in conjunction with FIG. 5, the online concierge system 102 determines measures of similarity between the user embedding 620 for the user 600 and recipe embeddings for various recipes in the recipe store 222 and identifies recipes 645 based on measures of similarity between the user embedding 620 for the user and the recipe embeddings. Recipes 645 having at least a threshold measure of similarity to the user embedding 620 (or having at least a threshold position in a ranking based on measures of similarity to the user embedding 620) are identified. Hence, the online concierge system 102 accounts for similarities between recipe embeddings and a user embedding 620 of the user 600 to identify certain recipes 645.

In various embodiments, the online concierge system 102 augments the recipes 645 selected from their measures of similarity to the user embedding 620 using connections between the recipes 645 and additional recipes from the recipe graph 640. In some embodiments, the online concierge system 102 retrieves additional recipes from the recipe graph 640 that are within a threshold number of connections to a recipe 645 identified based on a measure of similarity to the user embedding 620, allowing the online concierge system 102 to select from a wider range of recipes that accounts for relationships between recipes maintained by the recipe graph 640. Similarly, the online concierge system 102 retrieves recipes 635 previously presented to the user 600 from which the user 600 selected an item for inclusion in an order. As further described above, the online concierge system 102 may identify additional recipes connected to a recipe 635 previously presented to the user 600 from which the user 600 included an item after being displayed to the user 600 to identify a wider range of recipes for the user 600.

Hence, depending on amount of interaction by the user 600 with the online concierge system 102 and with recipes displayed by the online concierge system 102, the online concierge system 102 retrieves recipes from different sources within the recipe store 222. The sources from which recipes are retrieved in the example of FIG. 6 are recipes 630 identified from interactions by various users (e.g., global users, users within a threshold distance of a location of the user 600), recipes 635 previously presented to the user 600 or to users of a set 615 of similar users from which the user 600 or a user of the set 615 of similar users previously included an item after a recipe was displayed, and recipes 645 selected based on a measure of similarity to the user embedding 620 of the user 600 or to a characteristic embedding of the set 615 of similar users. The online concierge system 102 also accounts for relationships between recipes maintained by the recipe graph 640 to identify additional recipes. The online concierge system 102 selects 650 one or more of the identified recipes for display to the user 600. For example, the online concierge system 102 applies a trained purchase model to the user embedding 620 and to recipe embeddings for the identified recipes, with the trained purchase model trained based on prior inclusion of items from recipes displayed to the user 600 in orders received from the user 600. The trained purchase model outputs a probability of the user 600 including one or more items from a recipe after the recipe is displayed to the user 600. The trained purchase model may be any suitable machine learning model trained (e.g., using supervised learning, semi-supervised learning, etc.) from labeled data identifying embeddings of recipes previously displayed to the user 600, with the labels indicating whether the user 600 included one or more items from the recipe in an order after being displayed with the recipe. If the user 600 has not previously been presented with recipes, the online concierge system 102 may use information about inclusion of items in orders from other users (e.g., users of the set 615 of similar users) after recipes were displayed to the users to generate a purchase model. The online concierge system 102 selects recipes 650 for display to the user 600 having at least a threshold probability of the user 600 including one or more items from the recipes after the recipes are displayed to the user 600 or selects recipes 650 for display to the user 600 having at least a threshold position in a ranking based on probability of the user 600 including one or more items from the recipes after the recipes are displayed to the user 600. This allows the online concierge system 102 to account for various sources of recipes from the recipe store 222 from which recipes 650 are selected for display to the user 600 based on probabilities of the user 600 including items from recipes in one or more orders after being displayed with the recipes.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    obtaining, at an online concierge system, a plurality of recipes, each recipe including one or more items offered by one or more warehouses and instructions for combining the items included in the recipe;
    retrieving a recipe graph maintained by the online concierge system, the recipe graph identifying connections between recipes obtained by the online concierge system, a connection between recipes indicating one or more attributes shared between the connected recipes;
    generating recipe embeddings for each of the plurality of recipes by:
        applying a feed-forward neural network comprising multiple layers and weights between nodes in adjacent layers to information stored by the online concierge system identifying prior interactions by users of the online concierge system with recipes previously presented by the online concierge system;
    receiving, at the online concierge system, a request for one or more recipes from a user of the online concierge system;
    determining whether the user previously included one or more items included in a recipe that was previously displayed to the user by the online concierge system in an order the online concierge system received from the user;
    in response to determining that the user previously included one or more items included in the recipe that was previously displayed to the user by the online concierge system in the order the online concierge system received from the user:
        obtaining a user embedding for the user based on characteristics of the user;
        selecting one or more recipes for display to the user based on measures of similarity between the user embedding and one or more recipe embeddings for recipes; and
        transmitting information describing the selected one or more recipes to a client device for display to the user.

2. The method of claim 1, wherein selecting one or more recipes for display to the user based on measures of similarity between the user embedding and one or more recipe embeddings for recipes comprises:
    retrieving one or more recipes from which the user previously included at least one item in one or more orders after the one or more recipes were displayed to the user;
    identifying one or more additional recipes, each additional recipe having a connection to a retrieved recipe via the recipe graph;
    identifying candidate recipes from the retrieved one or more recipes and from the one or more additional recipes; and
    selecting one or more recipes from the candidate recipes and from other recipes based on measures of similarity between the user embedding and one or more recipe embeddings for recipes.

3. The method of claim 2, wherein the candidate recipes include one or more recipes having at least a threshold amount of interaction by global users of the online concierge system.

4. The method of claim 2, wherein the candidate recipes include one or more recipes having at least a threshold amount of interaction by users of the online concierge system within a threshold distance of a location associated with the user.

5. The method of claim 1, wherein selecting one or more recipes for display to the user based on measures of similarity between the user embedding and one or more recipe embeddings for recipes comprises:
ranking the one or more recipes based on the measures of similarity between the user embedding and the one or more recipe embeddings; and
selecting one or more recipes having at least a threshold position in the ranking.

6. The method of claim 1, further comprising:
in response to determining that the user did not previously include one or more items included in the recipe that was previously displayed to the user by the online concierge system in the order the online concierge system received from the user, determining whether the online concierge system previously received one or more orders from the user;
in response to determining the online concierge system previously received one or more order from the user:
obtaining the user embedding for the user;
obtaining user embeddings for other users of the online concierge system;
identifying a set of similar users from the other users of the online concierge system based on similarities between user embeddings of other users and the user embedding for the user;
retrieving one or more recipes from which one or more users of the set of similar users previously included at least one item in one or more orders after the one or more recipes were displayed to the one or more users of the set of similar users;
identifying one or more additional recipes, each additional recipe having a connection to a retrieved recipe via the recipe graph;
identifying candidate recipes from the retrieved one or more recipes and from the one or more additional recipes; and
selecting one or more recipes from the candidate recipes.

7. The method of claim 6, wherein identifying candidate recipes from the retrieved one or more recipes and from the one or more additional recipes comprises:
determining a characteristic embedding of the set of similar users from user embeddings for each user of the set of similar users; and
including one or more other recipes in the candidate recipes based on measures of similarity between the characteristic embedding and recipe embeddings of the one or more other users.

8. The method of claim 7, wherein the candidate recipes include one or more recipes having at least a threshold amount of interaction by users of the online concierge system within a threshold distance of a location associated with the user.

9. The method of claim 6, further comprising:
in response to determining the online concierge system has not previously received one or more order from the user, selecting one or more recipes having at least a threshold amount of interaction by users of the online concierge system; and
transmitting information describing the selected one or more recipes to a client device of the user for display.

10. The method of claim 9, further comprising:
identifying one or more additional recipes, each additional recipe having a connection to a selected recipe via the recipe graph; and
transmitting information identifying one or more of the additional recipes to a client device of the user for display.

11. A computer program product comprising a non-transitory computer readable storage medium having instructions encoded thereon that, when executed by a processor, cause the processor to:
obtain, at an online concierge system, a plurality of recipes, each recipe including one or more items offered by one or more warehouses and instructions for combining the items included in the recipe;
retrieve a recipe graph maintained by the online concierge system, the recipe graph identifying connections between recipes obtained by the online concierge system, a connection between recipes indicating one or more attributes shared between the connected recipes;
generate recipe embeddings for each of the plurality of recipes by:
applying a feed-forward neural network comprising multiple layers and weights between nodes in adjacent layers to information stored by the online concierge system identifying prior interactions by users of the online concierge system with recipes previously presented by the online concierge system;
receive, at the online concierge system, a request for one or more recipes from a user of the online concierge system;
determine whether the user previously included one or more items included in a recipe that was previously displayed to the user by the online concierge system in an order the online concierge system received from the user;
in response to determining that the user previously included one or more items included in the recipe that was previously displayed to the user by the online concierge system in the order the online concierge system received from the user:
obtain a user embedding for the user based on characteristics of the user;
select one or more recipes for display to the user based on measures of similarity between the user embedding and one or more recipe embeddings for recipes; and
transmit information describing the selected one or more recipes to a client device for display to the user.

12. The computer program product of claim 11, wherein select one or more recipes for display to the user based on measures of similarity between the user embedding and one or more recipe embeddings for recipes comprises:
retrieve one or more recipes from which the user previously included at least one item in one or more orders after the one or more recipes were displayed to the user;
identify one or more additional recipes, each additional recipe having a connection to a retrieved recipe via the recipe graph;
identify candidate recipes from the retrieved one or more recipes and from the one or more additional recipes; and
select one or more recipes from the candidate recipes and from other recipes based on measures of similarity between the user embedding and one or more recipe embeddings for recipes.

13. The computer program product of claim 12, wherein the candidate recipes include one or more recipes having at least a threshold amount of interaction by global users of the online concierge system.

14. The computer program product of claim 12, wherein the candidate recipes include one or more recipes having at least a threshold amount of interaction by users of the online concierge system within a threshold distance of a location associated with the user.

15. The computer program product of claim 11, wherein select one or more recipes for display to the user based on measures of similarity between the user embedding and one or more recipe embeddings for recipes comprises:
   rank the one or more recipes based on the measures of similarity between the user embedding and the one or more recipe embeddings; and
   select one or more recipes having at least a threshold position in the ranking.

16. The computer program product of claim 11, wherein the non-transitory computer readable storage medium further has instructions encoded thereon that, when executed by the processor, cause the processor to:
   in response to determining that the user did not previously include one or more items included in the recipe that was previously displayed to the user by the online concierge system in the order the online concierge system received from the user, determine whether the online concierge system previously received one or more orders from the user;
   in response to determining the online concierge system previously received one or more order from the user:
   obtain the user embedding for the user;
   obtain user embeddings for other users of the online concierge system;
   identify a set of similar users from the other users of the online concierge system based on similarities between user embeddings of other users and the user embedding for the user;
   retrieve one or more recipes from which one or more users of the set of similar users previously included at least one item in one or more orders after the one or more recipes were displayed to the one or more users of the set of similar users;
   identify one or more additional recipes, each additional recipe having a connection to a retrieved recipe via the recipe graph;
   identify candidate recipes from the retrieved one or more recipes and from the one or more additional recipes; and
   select one or more recipes from the candidate recipes.

17. The computer program product of claim 16, wherein identify candidate recipes from the retrieved one or more recipes and from the one or more additional recipes comprises:
   determine a characteristic embedding of the set of similar users from user embeddings for each user of the set of similar users; and
   include one or more other recipes in the candidate recipes based on measures of similarity between the characteristic embedding and recipe embeddings of the one or more other users.

18. The computer program product of claim 17, wherein the candidate recipes include one or more recipes having at least a threshold amount of interaction by users of the online concierge system within a threshold distance of a location associated with the user.

19. The computer program product of claim 16, wherein the non-transitory computer-readable storage medium further has instructions encoded thereon that, when executed by the processor, cause the processor to:
   in response to determining the online concierge system has not previously received one or more order from the user, select one or more recipes having at least a threshold amount of interaction by users of the online concierge system; and
   transmit information describing the selected one or more recipes to a client device of the user for display.

20. The computer program product of claim 19, wherein the non-transitory computer-readable storage medium further has instructions encoded thereon that, when executed by the processor, cause the processor to:
   identify one or more additional recipes, each additional recipe having a connection to a selected recipe via the recipe graph; and
   transmit information identifying one or more of the additional recipes to a client device of the user for display.

* * * * *